United States Patent [19]

Merkl

[11] 4,032,623

[45] * June 28, 1977

[54] HYDROPEROXY GROUP-CONTAINING ALUMINUM COMPOUND AND METHOD OF MAKING THE SAME

[76] Inventor: George G. Merkl, 46 Sunset Court, Haworth, N.J. 07641

[ * ] Notice: The portion of the term of this patent subsequent to July 13, 1993, has been disclaimed.

[22] Filed: Aug. 16, 1976

[21] Appl. No.: 714,829

Related U.S. Application Data

[63] Continuation-in-part of Ser. No. 331,766, Feb. 12, 1973, abandoned.

[52] U.S. Cl. .............................. 423/582; 423/625; 423/626; 423/628; 423/630; 252/463; 252/466 PT; 106/290

[51] Int. Cl.² ...................... C01F 7/00; C01F 7/02

[58] Field of Search .......... 423/625, 627, 630, 582, 423/628; 252/463; 106/42, 65, 290

[56] References Cited

UNITED STATES PATENTS

| | | |
|---|---|---|
| 3,026,177 | 3/1962 | St. Pierce et al. .................. 423/625 |
| 2,809,169 | 10/1957 | Whiteley et al. ................... 423/627 |
| 2,820,694 | 1/1958 | Heruert et al. ..................... 423/627 |
| 2,847,387 | 8/1958 | Smith .................................. 423/627 |
| 2,852,473 | 9/1958 | Welling et al. ..................... 423/627 |
| 3,026,210 | 3/1962 | Coble ................................. 423/625 |
| 3,042,628 | 7/1962 | Cramer et al. ..................... 423/627 |
| 3,056,725 | 10/1962 | Rinse et al. ........................ 423/625 |
| 3,718,494 | 2/1973 | Jacobson ............................ 423/625 |
| R27,083 | 3/1971 | Klingler et al. .................... 423/625 |

FOREIGN PATENTS OR APPLICATIONS

| | | | |
|---|---|---|---|
| 769,026 | 2/1957 | United Kingdom | 423/627 |

Primary Examiner—Herbert T. Carter
Attorney, Agent, or Firm—Arnold, White & Durkee

[57] ABSTRACT

A hydroperoxy-group-containing aluminum compound is prepared by a process which comprises:
  contacting and reacting, at room temperature or below, and in the substantial absence of water, (a) a reactive metal comprising aluminum of a purity of at least 99.9% by weight permeated with a liquid metal selected from mercury, gallium and indium/-gallium alloys with (b) a liquid reactant comprising (i) hydrogen peroxide in (ii) a liquid organic compound having no multiple carbon-to-carbon bonds.

The aluminum compounds produced can be used, for example, as substrates for electronics, in the preparation of synthetic gems, ceramics and paint pigments. The aluminum compound is prepared in sheet for plate form, resembling mica in physical appearance.

In an alternative embodiment, a metal or metal salt is added to the reactive system to yield a hydroperoxy-group-containing aluminum compound with the desired metal deposited thereon.

9 Claims, 3 Drawing Figures

HYDROPEROXY GROUP-CONTAINING ALUMINUM COMPOUND AND METHOD OF MAKING THE SAME

REFERENCE TO RELATED APPLICATION

This application is a continuation-in-part of application Ser. No. 331,766, filed Feb. 12, 1973, and now abandoned, and entitled "MICA-TYPE ALUMINA AND RELATED COMPOUNDS". The subject matter of this application is also related to the subject matter of the following co-pending applications:
Application Ser. No. 497,560, filed Aug. 15, 1974
Application Ser. No. 319,293, filed Dec. 29, 1972
Application Ser. No. 514,681, filed Oct. 15, 1974

BACKGROUND OF THE INVENTION

1. Field of the Invention

The present invention is directed to a method of producing hydroperoxy-group-containing aluminum compounds and such compounds so produced. More specifically, the present invention is directed to a method of producing hydroperoxy-group-containing aluminum compounds in a sheet or plate-like form, the compounds being transparent, appearing polymeric in nature, and having the physical appearance of mica.

2. Description of Prior Art

The patent literature describes various types of transparent alumina and processes for producing such transparent alumina. For example, U.S. Pat. No. 3,026,210 to R. L. Coble describes a transparent alumina in which the alumina comprises high density polycrystalline alumina bodies having in-line transmission of not less than 10%/ml thickness of radiant energy of wave length in the range from 0.30 micron to about 6.6 microns. Such transparent alumina bodies are prepared by compacting a mixture of finely divided alumina with minor additions of magnesia and firing the compact for predetermined periods of time at a temperature not lower than about 1,700° C, either in a vaccum or in a hydrogen environment.

U.S. Pat. No. 3,026,177 to P. D. S. St. Pierre, et al. also involves the preparation of transparent polycrystalline alumina. In accordance with this patent, the product is produced by compacting a substantially pure, finely divided alumina and subjecting the compact to a first firing in a hydrogen atmosphere at a temperature of from about 1,650° C to 1,750° C for a period of from 50 to 300 minutes and thereafter, subjecting the alumina body to a second firing in a hydrogen atmosphere at a temperature of from about 1800° C to 2000° C for a period of not less than 15 minutes. This second firing is said to improve the transparency of the polycrystalline alumina.

U.S. Pat. No. Re. 27,083 in the name of Emile A. Klinger, et al., describes a dense polycrystalline body of alumina which has adequate transparency and high mechanical strength. Such product is described as having an average size of grains of less than 10 microns and a specific gravity greater than 3.96. The polycrystalline body of fine grained alumina is obtained by compacting a powder of aluminum oxide particles having a particle size not substantially greater than 3 microns and sintering the compacted body in the substantial absence of gases having a molecular weight substantially greater than that of hydrogen for a period of 3 to 30 minutes at a temperature of 1700°–1950° C.

Also, U.S. Pat. No. 3,718,494 to Howard H. Jacobson describes sheet-like alpha alumina having an average thickness of 10–250 m$\mu$ and major faces averaging 15–1000 m$\mu^2$. Such sheet-like alpha alumina is prepared by the formation of mullite in the presence of a reactive flouride salt such as cryolite.

With the exception of the last noted patent to Jacobson, each of the above-described processes involves compacting a high temperature sinter to produce transparent bodies of alumina. None illustrates the direct production of an aluminum-containing product, such as alumina, in a transparent form directly in its formative reaction. Furthermore, in none of these products is the alumina in a sheetlike or plate-like form, having a physical structure similar to mica and appearing polymeric in nature.

The preparation of an aluminum product having a substantial amount of hydroperoxy groups is a desirable goal in that the hydroperoxy groups create unique physical and chemical characteristics in the aluminum compound. For example, unique reactivity and catalytic properties are associated with the presence of hydroperoxy groups. The use of hydrogen peroxide to produce an alumina product, specifically as a hydro-forming catalyst, is illustrated in U.S. Pat. No. 2,852,473 to Welling.

The Welling patent relates to a process which involves a first amalgamation of aluminum with a solution of a mercuric salt, such as mercuric chloride, and subsequent contacting of the amalgamated aluminum with a dilute aqueous solution of hydrogen peroxide. With respect to the desired hardness, porosity and surface area of the catalyst, a desirable product is said to be obtained when the temperature of the reaction medium is maintained between about 70° C and the boiling point of the aqueous hydrogen peroxide. Generally, a granulated aluminum is utilized to prepare this alumina hydro-forming catalyst.

A process such as described in the Welling patent cannot produce an alumina product in which the product is transparent, in sheet or plate form and with the physical appearance of mica. Moreover, a product such as that produced by the process of Welling cannot be polymeric in nature. Still further, the hydroperoxy group content of such product is minimal due to the presence of a substantial amount of water in the reaction system and the employment of a high temperature reaction, since hydrogen peroxide is unstable under the temperature conditions of Welling. Still further, the use of a conventional amalgamated aluminum does not lend itself to the preparation of an aluminum product containing hydroperoxy groups and one which can be characterized as transparent, in sheet or plate form and with the physical appearance of mica. Such a product has now been obtained, however, by adherence to the parameters of the present invention.

SUMMARY OF THE INVENTION

The method of the present invention allows the formation of an aluminum product having the physical appearance of mica, the aluminum product further being characterized by the presence of hydroperoxy groups, transparency and a sheet or plate-like form, the aluminum product appearing polymeric in nature.

The aluminum-containing product is prepared by contacting and reacting, at room temperature or below (a) a reactive metal comprising aluminum metal of a purity of at least 99.9% by weight permeated with a liquid metal selected from mercury, gallium and indium/gallium alloys with (b) a liquid reactant comprising (i) hydrogen peroxide in (ii) an anhydrous liquid organic compound having no multiple carbon-to-carbon bonds. The liquid reactant, i.e., hydrogen peroxide, in the anhydrous liquid organic compound is substantially free of water, i.e., has up to about 10% by weight water, preferably as little water as possible.

A further aluminum-containing product can be obtained by firing the product obtained by the foregoing reaction at an elevated temperature. This appears to effect a release of hydrogen from the hydroperoxy-group-containing aluminum product.

In an alternative embodiment, a hydroperoxy-group-containing aluminum product having a metal deposited on or between sheets or plates is obtained by adding a minor amount of a metal powder or metallic salt to the reaction system.

DESCRIPTION OF PREFERRED EMBODIMENTS

Figure 1:
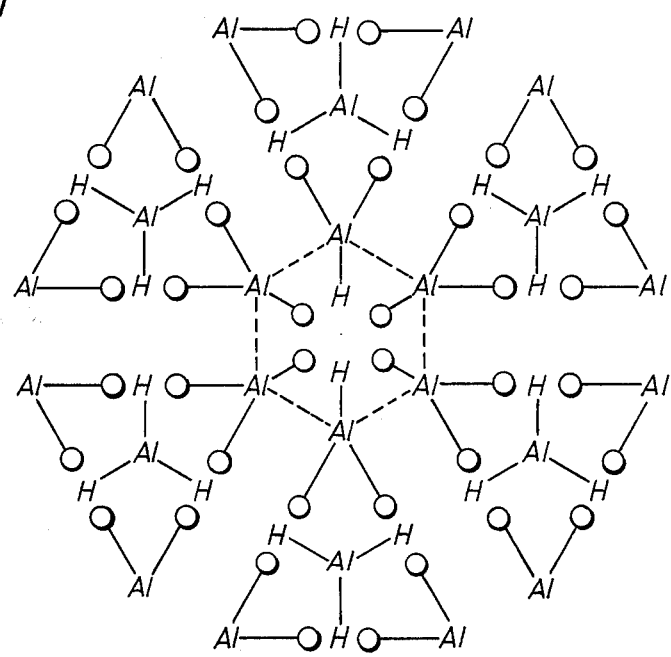
FIG. 1 is a representation of the proposed chemical structure of the aluminum-containing product of the present invention as obtained by reaction between an activated aluminum and hydrogen peroxide.

As indicated previously, a hydroperoxy-group-containing aluminum compound, specifically one having a γ-structure, is produced in accordance with the present invention by the reaction of a reactive form of aluminum and a liquid reactant comprising hydrogen peroxide in an anhydrous liquid organic compound having no multiple carbon-to-carbon bonds. Such hydroperoxy-group-containing aluminum compound is characterized by transparency, and formation in a sheet or plate-like form, the physical appearance of the product resembling that of mica. In addition, the hydroperoxy-group-containing aluminum compound appears polymeric in nature.

The reactants necessary to achieve such hydroperoxy-group-containing aluminum product will be discussed individually below:

Reactive Form of Aluminum

A principal reactant in the preparation of the hydroperoxy-group-containing aluminum product of the present invention is aluminum metal, which has been activated or made reactive through permeation by a second metal, i.e., a liquid metal selected from mercury, gallium and indium/gallium alloys. By "activated" or "reactive" is means that the inter-crystalline structure of the aluminum is made uniquely and exceptionally receptive to chemical reaction. A more thorough description of the aluminum activation technique as well as an explanation of the physio-chemical phenomena which occur during activation is contained in copending application Ser. No. 497,560, filed Aug. 15, 1974, which is hereby incorporated by reference.

Basically, activation of the aluminum is carried out by wetting the surface of the aluminum in the presence of a source of hydrogen ions (protons), such as hydrochloric acid, with a liquid second metal selected from mercury, gallium and indium/gallium alloys until the aluminum has been permeated with the second metal. Evidence has been developed to establish that during this permeation of the aluminum the grain boundaries of the aluminum are actually penetrated by atoms of the second metal. This appears to create a realignment of the aluminum grain boundaries which has the effect of opening up the domains within the aluminum metal, resulting in unique reactivity properties.

The activated aluminum which is utilized in the process of the present invention shows many unique characteristics when compared with the base untreated aluminum metal. One of these is the dissolution of the aluminum and release of hydrogen ions or protons when placed in a liquid medium containing a source of hydrogen ions.

In preparing the activated aluminum, aluminum metal in the form of relatively small rods, bars or sheets, etc., preferably substantially free of bends and twists, is generally utilized. Preferably, soft aluminum metal having a purity of at least 99.9% by weight is used. The use of an aluminum metal with a substantial percentage of impurities is disadvantageous in that activation requires substantially longer periods of time. More importantly, there is the tendency for the impurities to enter into and precipitate from the subsequently formed products. Generally, however the impurities are leached from the aluminum during extended periods of activation.

Using as an example the aluminum-mercury system, activation of the aluminum can be effectively carried out by floating an aluminum bar or rod on mercury in the presence of a hydrogen ion donating medium. This hydrogen ion donating medium can be an aqueous inorganic or organic acid, an aqueous alkaline solution of an alcohol, etc. In principle, any hydrogen ion source or hydrogen ion donating medium can be utilized. It is hypothesized that the mercury is caused to penetrate and diffuse through the aluminum in the form of a stable hydride formed in situ by the reaction between the mercury metal and hydrogen ions of the hydrogen ion donating medium. The ability of mercury, indium and gallium to act in a similar fashion appears to be associated with the hydride-forming capabilities of these metals and the fact that each of these metals has an atomic volume similar to that of hydrogen itself. This allows the metals to penetrate and diffuse through the aluminum either together with hydrogen or in the form of the hydride.

As will be apparent to those skilled in this art, the length of time required for activation of the aluminum with mercury will depend upon many factors, including the exposed surface area, which is related to the hardness of the aluminum, and the amount of impurities present in the aluminum. Longer times are required for harder aluminums and those with greater impurity contents. As a general rule, adequate activation of aluminum rods with mercury can be achieved in a time period of from about two hours to about 24 hours. When utilizing a preferred soft grade of aluminum, activation can be achieved in a period of from 8 to 12 hours.

When the aluminum is activated, it becomes embrittled and can be easily broken, using a snapping action. By breaking the aluminum and examining the grain structure at the break, one can determine the degree to which the mercury has penetrated and diffused throughout the aluminum. In accordance with the preferred embodiment of the present invention, the desired hydroperoxy-group-containing aluminum products are prepared utilizing activated aluminum in which the mercury, gallium, or indium/gallium alloy has penetrated and diffused entirely throughout the aluminum structure.

In forming the activated aluminum, high temperatures should be avoided since high temperatures appear to prevent grain structure realignment due to lattice expansion. Generally, the activation of aluminum with mercury can be carried out under ambient temperature conditions, with a temperature in the range or from 40° F to 100° F being preferred. When utilizing gallium as the second metal, it is often desirable to gently heat the gallium in order to maintain the gallium in the liquid state, thereby allowing the permeation to more effectively take place. Here again, however, excessive temperatures should be avoided.

When forming the activated aluminum using gallium or an indium/gallium alloy, the permeation and diffusion of the gallium or indium/gallium through the aluminum rod may be initiated merely be contacting one end of the aluminum rod with the second metal or metals in the presence of the hydrogen ion donating medium. The initiation of diffusion may be observed by noting the surface wetting of the aluminum with the second metal or metals above the point of contact. Further diffusion of the gallium or indium/gallium alloy through the entirety of the aluminum can then be continued by placing the aluminum rod in an anhydrous organic liquid medium such as alcohol, or the like, which is capable of donating hydrogen ions for effecting further diffusion.

With respect to the indium/gallium alloys which may be used, essentially any alloy composition will be suitable, ranging from 90% by weight gallium and 10% by weight indium to 10% by weight gallium and 90% by weight indium. When employing such alloy, however a 50:50 weight mixture of gallium and indium is extremely effective. As the percentage of indium is increased in the indium/gallium alloy, there is an increasing tendency for the activated aluminum to disintegrate. This does not prevent production of the desired products of the present invention, but could slightly complicate withdrawal of unreacted activated aluminum from the reaction medium. The amount of mercury, gallium or indium/gallium alloy which penetrates and diffuses through the aluminum will depend, of course, upon the length of treatment, temperature of treatment and the ability of the aluminum to retain the second metal or metals. As previously mentioned, it is preferred in accordance with the present invention to employ an activated aluminum in which the mercury, gallium or indium/gallium alloy has penetrated entirely through the aluminum.

Generally, a soft aluminum will pick up and retain a maximum of about 5% by weight of mercury during the activation process, with typical pickups being in the 2.5 to 3.5% by weight range. This amount of mercury is very effective to achieve the desired results of the present invention. Even with much smaller amounts of mercury, however, e.g., amounts as low as 0.1%, the aluminum becomes activated and can be used to produce the unique products of the present invention. It is preferred, however, to operate with a mercury content within the above specified range of about 2.5% to about 3.5% by weight.

It has generally been found that an aluminum activated with gallium or indium/gallium alloy is more active than the mercury-activated aluminum. For this reason, the amount of gallium or indium/gallium required to achieve suitable activation is less than the amount of mercury required. Generally, the aluminum will pick up and retain a maximum of about 3% by weight gallium or indium/gallium alloy. However, suitable activation can be achieved with as little as about 0.05 to about 1.0% by weight gallium or indium/gallium alloy and it is preferred to utilize an amount in this range. However, it has been found that even with amounts of these metals as low as 0.01% by weight, very active aluminum effective for the process of the present invention can be provided.

The Liquid Reactant

The liquid reactant is separated into two portions, the first being the active reactant, hydrogen peroxide, and the second being a carrier for the hydrogen peroxide, specifically a liquid organic compound having no multiple carbon-to-carbon bonds.

The hydrogen peroxide reactant in accordance with the method of the present invention is generally in the form of an aqueous solution of hydrogen peroxide. However, since it is necessary in accordance with the present invention to minimize the amount of water present in the reaction system, the aqueous solution of hydrogen peroxide should be somewhat concentrated, with concentrations of 30% hydrogen peroxide or greater being generally used, preferably 50% hydrogen peroxide or greater. In addition, it is applicable in accordance with the present invention to employ 100% hydrogen peroxide. However highly concentrated hydrogen peroxide solutions, i.e., those of about 70–95% concentration must be handled with care.

The vehicle or carrier for the hydrogen peroxide can effectively comprise any liquid organic compound having only single carbon-to-carbon bonds, i.e., one which contains no carbon-to-carbon double bonds. Preferably, such liquid organic compound is an anhydrous compound, again to effectively minimize the water content of the reaction system. Typical examples of such liquid organic compounds having no carbon-to-carbon double bonds include, for example, alcohols, particularly lower monohydric alcohols, such as methanol, ethanol, isopropyl alcohol, n-butyl alcohol, isobutyl alcohol, amyl alcohol, hexanol, etc.; ketones, particularly ketones of up to six carbon atoms, including for example, formaldehyde, acetaldehyde, etc.

The absence of carbon-to-carbon double bonds in the liquid organic compound acting as a vehicle or carrier for the hydrogen peroxide is important since compounds with carbon-to-carbon double bonds tend to enter into reaction with the activated or reactive aluminum, and in some instances, take part in polymerization reactions. Accordingly, such reactions which may tend to interfere with the interaction and reaction between the hydrogen peroxide and activated aluminum should be avoided. Accordingly, any liquid organic compound which does not readily react with the activated aluminum under the conditions of the present method can be effectively employed as the carrier or vehicle for the hydrogen peroxide.

In order to minimize the water content of the liquid reactant in accordance with the present invention, the carrier or vehicle liquid is generally employed in a large amount with respect to the hydrogen peroxide solution. As indicated previously, the total water content of the liquid reactant should not exceed about 10% by weight.

Generally, such water content is about 2–5% by weight. This is effectively achieved by employing a ratio of the liquid organic compound having no carbon-to-carbon double bonds to the aqueous hydrogen peroxide solution of from about 2:1 to about 20:1 or more. Certainly it should be apparent that even greater amounts of the carrier or vehicle when compared to the aqueous hydrogen peroxide solution can be utilized to even further minimize the amount of water present in the liquid reactant system.

The use of an anhydrous liquid organic compound is advantageous in the process of the present invention since the ahydrous organic liquid will have the tendency to tie up the small percentage of free water present in the reaction system, such as in the aqueous hydrogen peroxide reactant. Accordingly, the amount of anhydrous liquid organic compound based on the amount of hydrogen peroxide should preferably be sufficient to tie up any free water present in the system. This allows the reaction system to be substantially free of free water. Accordingly, as used throughout, the expression "substantial absence of water" is meant to embrace the above limitations, specifically the limitation that a maximum of 10% water can be present in the reaction system.

Optional Metallic Reactant

It is possible in accordance with the present invention to deposit on the hydroperoxy-group-containing aluminum compound a metal or combination of metals by employing in the reaction system a powdered metal or metallic salt capable of depositing the metal under the conditions of the reaction. By employing such metal powder of metal salt in the process of the present invention, the metal or combination of metals are deposited on the hydroperoxy-group-containing aluminum product between sheets or flakes. This can be carried out to provide coloration to the hydroperoxy-group-containing aluminum compound, such as in the preparation of a metallic pigment, or can be used to deposit a catalytic component, such as platinum, palladium, etc., on the hydroperoxy-group-containing aluminum compound, which provides a support for the catalyst.

Typical metals applicable in accordance with the present invention include, for example, platinum, palladium, chromium, manganese, titanium, silver, gold, iron, cobalt, magnesium, cadmium, nickel, copper, zinc, zirconium, alkali metals, etc. Again, where possible, these metals can be utilized in the form of the metallic powder or the salts of these metals which are capable of depositing the metal under the conditions of the reaction can be utilized. Typical salts include, for example, the oxide, nitrate, or chloride of the respective metals. The salt of the metal should be one which is soluble in the carrier medium, e.g., alcohol, utilized in the reaction system of the present invention.

Generally, it is necessary only to deposit a very minor amount of the metal onto the hydroperoxy-group-containing aluminum compound to achieve the desired coloration and/or catalytic properties. Accordingly, such metal or metallic salt should be employed in this alternative embodiment in that amount. An amount of about 0.01% to about 5% by weight based upon the weight of the reactive or activated aluminum is sufficient for this purpose. Here again, however, somewhat lesser or greater amounts can be utilized to achieve particular purposes.

Reaction Parameters

As indicated previously, the process of the present invention to prepare the hydroperoxy-group-containing aluminum compound is carried out by simply contacting and reacting the reactive aluminum with a liquid comprising (i) hydrogen peroxide in (ii) an anhydrous liquid organic compound having no multiple carbon-to-carbon bonds. In addition, as previously indicated, such reaction is carried out in the substantial absence of water. Still further, it is important in accordance with the present invention that the reaction be carried out without heating, i.e., at room temperature or below, preferably below room temperature, by cooling the reaction system during the reaction. This can be achieved in any suitable manner, such as by carrying out the reaction with the reaction vessel immersed in an ice bath.

The process of the present invention is preferably carried out by adding the reactive aluminum in rod, bar or sheet form to a suitable reaction vessel, preferably vertically oriented, with the activated aluminum rod being immersed in the liquid reaction system comprising the hydrogen peroxide in the anhydrous liquid organic compound having no multiple carbon-to-carbon bonds. It is totally unnecessary to use any sophisticated reaction system and unnecessary to provide any agitation of the reaction system. Clearly, all that is necessary in accordance with the present invention is to bring together the hydrogen peroxide and reactive or activated aluminum in a suitable reaction vessel in the substantial absence of water, and at room temperature or below.

In accordance with the process of the present invention, by maintaining reactive contact between the hydrogen peroxide and reactive or activated aluminum, it appears that a layer of hydrogen peroxide forms over the surface of the activated or reactive aluminum. Another layer of the hydrogen peroxide forms over the first layer and apparently, successive layers build up in this manner.

In accordance with the above hypothesized formation of the hydroperoxy-group-contaning aluminum compound, it is presumed that the hydrogen peroxide groups alternate in accordance with the charge pattern distribution on the atoms therein. Highly concentrated hydrogen peroxide has a tendency to produce hydroperoxy groups which are relatively stable radicals. It is hypothesized that during the production of such hydroperoxy groups, the associated hydrogen ion diffuses into and then out of the reaction or activated aluminum. As this reaction continues, the sheet or flakelike form of the hydroperoxy-group-containing aluminum compound is developed in accordance with the hypothesized atomic structure illustrated in FIG. 1.

Referring to FIG. 1, it is noted that from the proposed or hypothesized model, there is a sharing of hydroperoxy groups by the aluminum atoms. Therefore, a more accurate representation of the basic building block of the hydroperoxy-group-containing aluminum compound of the present invention may be the following:

Each of these formuli and atomic structures are merely hypothesized, however, and there is no intention that this invention is limited thereto. Rather, such hypotheses are presented for a more clear understanding of the process of the present invention.

As indicated previously, the hydroperoxy-group-containing aluminum compound of the present invention is formed as sheets or flakes which resemble mica in physical appearance. These sheets or flakes which are successively built up on the reactive or activated aluminum rod separate or flake off of the aluminum. The product can then be easily removed, as by decanting the liquid, filtration, etc.

The individual layers of the hydroperoxy-group-containing aluminum compound in accordance with the present invention are transparent to natural light. In this regard, such layers resemble window glass in their translucent properties. However, when multiple layers of the hydroperoxy-group-containing aluminum compound are built up, the product is pearlescent due to the light refraction associated with the multiple layers.

While the hydroperoxy-group-containing aluminum compound is formed in the above-described reaction as a clear, transparent product, a pigment-type product, i.e., one which is colored, can be produced as previously described by including a metal powder or soluble metal salt in the reaction system. Accordingly, various colored products can be produced. In addition, by the judicious selection of the metallic component, highly catalytic products with the hydroperoxy-group-containing aluminum compound as a support can be produced.

The hydroperoxy-group-containing aluminum compound of the present invention has the property of being stable over a wide temperature range. However, when this product is subjected to a greatly elevated temperature in the order of 2000° C or higher, hydrogen ions are released from the structure of the hydroperoxy-group-containing aluminum compound. It is hypothesized that such release of hydrogen atoms results in a product having a structure as illustrated in FIG. 2.

Figure 2:
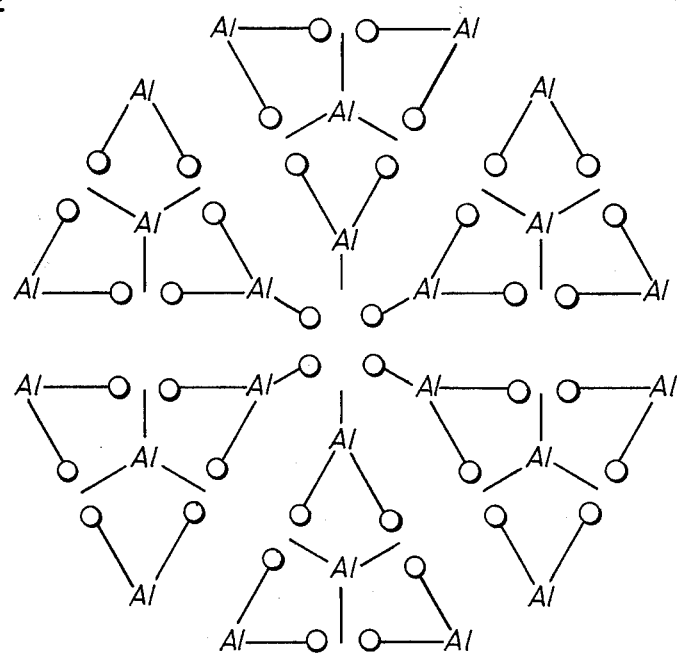
FIG. 2 is a representation of the proposed chemical structure of the aluminum-containing product of FIG. 1, after firing at elevated temperature.

It is noted from FIG. 2 that the proposed structure corresponds to that of sapphire. Presumably, the basic building block of the hydroperoxy-group-containing aluminum compound after firing at a temperature in the order of 2000° c takes the form as follows:

It is interesting to compare the reaction of the hydroperoxy-group-contaning aluminum compound with sulfuric acid, both before and after firing. Before firing, it appears as though a sulfite is formed, thereby illustrating that the aluminum is in an ionic form. However, after firing, no reaction with sulfuric acid appears to take place.

Figure 3:
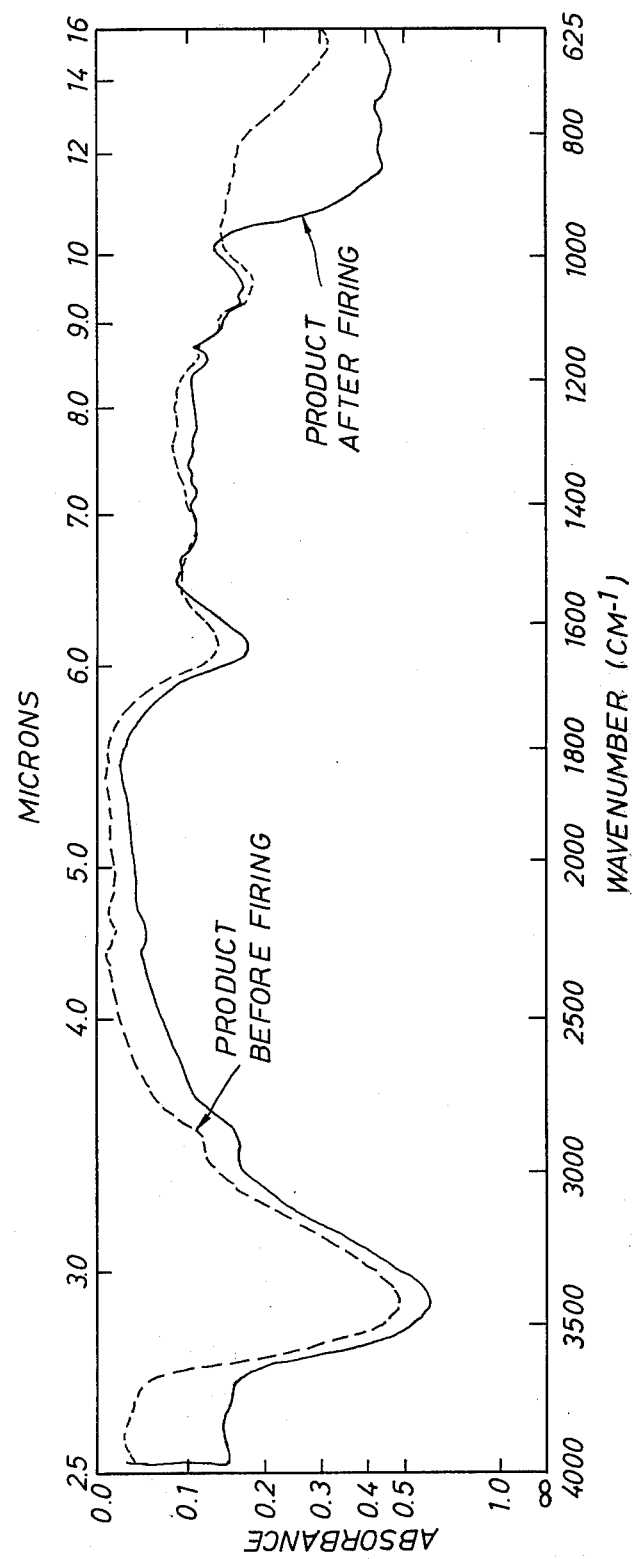
FIG. 3 comprises two superimposed infrared scans of the aluminum-containing product; one as produced and one after firing.

FIG. 3 represents infrared scans of the hydroperoxy-group-containing aluminum compound both before and after firing. The wide absorption band in the region of 3400 cm$^{-1}$ in both infrared scans tends to establish the presence of hydroperoxy groups, rather than hydroxy groups which would be easily lost in firing. The change which takes place in the region of 900 cm$^{-1}$ is believed to be associated with the breaking of hydrogen bonds and release of hydrogen from the structure.

The present invention will now be described by reference to the following specific examples. It should be understood, however, that such examples are presented for purposes of illustration only., and the present invention can not under any circumstances be deemed limited thereby.

Unless otherwise stated in the following examples, and throughout the specification, all parts and percentages are by weight.

EXAMPLE 1

A high purity aluminum rod of about 100 grams and having a diameter of about one-half inch is activated by permeation with mercury in the presence of hydrochloric acid. The aluminum rod is saturated to the point of having about 3% by weight of mercury. The activated rod is then washed thoroughly with distilled water in order to remove the presence of residual hydrochloric acid or any chloride compound which might have been formed during the treatment. A tall, narrow vessel is filled with a mixture of about 1000 ml of anhydrous methanol and about 50 ml of hydrogen peroxide having a concentration of 30%. The activated aluminum rod is placed into the vessel so that it retains a vertical position. This is desirable in order to increase the available surface area to the reactants and to permit the free conduction and convection of heat away from the reactive aluminum rod. Cooling is applied where necessary to maintain the temperature at room temperature or below. The activated aluminum rod is submerged throughout the reaction. The reaction which takes place produces thin sheets which appear to peel off of the activated aluminum rod and accumulate in the vessel. It is desirable not to disturb or jar the vessel in order to avoid shattering the sheets. The sheets formed can be removed by removing the activated aluminum rod and then decanting the liquid. The final product can then be washed in distilled water and dried.

EXAMPLE 2

Example 1 is repeated with the use of an equivalent amount of anhydrous ethyl alcohol instead of anhydrous methanol.

EXAMPLE 3

Example 1 is repeated utilizing an equivalent amount of ethylene glycol in lieu of methanol.

EXAMPLE 4

Example 1 is repeated utilizing an equivalent amount of isopropyl alcohol in lieu of methanol.

EXAMPLE 5

Examples 1–4 are repeated with the exception that a 50% concentrated aqueous solution of hydrogen peroxide is used and the vessel is cooled with an ice pack.

EXAMPLE 6

Examples 1–4 are repeated with the exception that a 70% concentrated solution of hydrogen peroxide is used and the vessel is cooled with an ice pack.

EXAMPLE 7

Following the procedure of Example 1, a mercury prepared activated aluminum rod is reacted with 800 ml of anhydrous ethyl alcohol mixed with 200 ml of hydrogen peroxide having a concentration of 50%. A similar product is produced.

EXAMPLE 8

Example 7 is repeated except that 1 g of chromium oxide or chromium nitrate is mixed into the solution before the activated aluminum rod is inserted. This results in a green product with chromium deposited thereon.

EXAMPLE 9

Example 7 is repeated except that either manganese oxide or manganese nitrate is mixed into the solution before the activated aluminum rod is inserted. A pink product is produced.

EXAMPLE 10

The procedure of Example 7 is repeated except that 1 g of titanium nitrate or titanium oxide is added to the solution before the activated aluminum rod is inserted. A white product is produced.

EXAMPLE 11

The procedure of Example 7 is repeated except that 1 g of cobalt oxide or cobalt nitrate is added to the solution before the activated aluminum rod is inserted. A blue smokey product results.

EXAMPLE 12

The procedure of Example 7 is repeated except that 1 g of magnesium oxide or magnesium nitrate is added to the liquid before the activated aluminum rod is inserted.

EXAMPLE 13

The procedure of Example 7 is repeated except that 1 g of ferric oxide or ferric nitrate is added to the liquid before the activated aluminum rod is inserted. A reddish or ruby colored product results.

EXAMPLE 14

The procedure of Example 7 is repeated except that 1 g of cadmium oxide or cadmium nitrate is added to the liquid before the activated aluminum rod is inserted.

EXAMPLE 15

The procedure of Example 7 is repeated except that 1 g of nickel oxide or nickel nitrate is added to the liquid before the activated aluminum rod is inserted.

EXAMPLE 16

The procedure of Example 7 is repeated except that 1 g of zirconium oxide or zirconium nitrate is added to the liquid before the activated aluminum rod is inserted.

EXAMPLE 17

The procedure of Example 7 is repeated except that 1 g of potassium chromate is added to the liquid before the activated aluminum rod is inserted.

EXAMPLE 18

The procedure of Example 7 is repeated except that 1 g of cupric nitrate is added to the liquid before the activated aluminum rod is inserted.

EXAMPLE 19

The procedure of Example 7 is repeated except that 1 g of zinc oxide or zinc nitrate is added to the liquid before the activated aluminum rod is inserted.

EXAMPLE 20

A catalyst supported on the hydroperoxy-group-containing aluminum compound of the present invention is prepared by a procedure similar to that of Example 1. A mercury prepared activated aluminum rod permeated with approximately 3% by weight mercury is contacted and reacted with 1000 ml anhydrous alcohol (SD40) with 100 ml of hydrogen peroxide, a 50% aqueous solution. Some 30 drops of silver nitrate are added to the alcohol-hydrogen peroxide liquid system prior to introduction of the activated aluminum rod. This results in the deposition of silver on the sheet or plate-like hydroperoxy-group-containing aluminum product.

EXAMPLE 21

The procedure of Example 20 is repeated with the exception that 30 drops of gold chloride are utilized in lieu of the silver nitrate. This results in the deposition of gold on the hydroxy-group-containing aluminum product.

EXAMPLE 22

The procedure of Example 20 is repeated with the exception that 24 drops of platinum chloride are utilized in lieu of the silver nitrate. The resulting product comprises a sheet or plate-like hydroperoxy-group-containing aluminum support with platinum deposited thereon. This product shows excellent catalytic activity.

EXAMPLE 23

The procedure of Example 20 is again repeated with the exception that 6 drops of palladium chloride are utilized in lieu of the silver nitrate. This product comprises palladium metal deposited on the hydroperoxy-group-containing aluminum support. Again, excellent catalytic activity is illustrated.

EXAMPLE 24

The hydroperoxy-group-containing aluminum product formed in sheet or plate-like form in accordance with Example 1 is fired in an oven at a temperature in the order of 2000° C. This firing results in the release of hydrogen atoms from the solid sheet-like product. This fired product is particularly suitable for electronic support applications.

While the present invention has been described primarily with regard to the foregoing specific exemplification and reference to specific embodiments, it should be understood that the present invention can not under any circumstances be deemed limited thereto, but rather, must be construed as broadly as all of any equivalents thereof.

What is claimed is:

1. A method of forming a hydroperoxy-group containing aluminum product which comprises:
   contacting and reacting at room temperature or below, and in the substantial absence of water, (a) an activated metal comprising aluminum of a purity of at least 99.9% by weight, permeated with a liquid metal selected from mercury, gallium and gallium-/indium alloys, with (b) a liquid comprising:
   i. hydrogen peroxide in
   ii. a liquid organic compound having no multiple carbon-to-carbon bonds and which is non-reactive with said activated metal under the conditions of the reaction.

2. The method of claim 1 wherein the reaction is carried out below room temperature.

3. The method of claim 1 further comprising:
collecting the formed hydroperoxy-group-containing aluminum compound and firing said compound at an elevated temperature.

4. The process of claim 1 further comprising:
adding to the liquid of the reaction system a minor amount of a powdered metal or metal salt soluble in said anhydrous liquid organic compound to deposit said metal onto the formed hydroperoxy-group-containing aluminum product.

5. The process of claim 1 wherein the reaction system contains a maximum of 10% by weight water.

6. The process of claim 1 wherein the weight ratio of (ii) to (i) ranges from about 2:1 to about 20:1.

7. The process of claim 1 wherein said liquid organic compound is selected from alcohols, ketones and aldehydes.

8. The process of claim 7 wherein said liquid organic compound is a saturated alcohol.

9. The product prepared by the process of claim 1 having the infrared spectra shown for the product before firing in FIG. 3.

* * * * *